(12) United States Patent
Asrani et al.

(10) Patent No.: US 10,243,262 B2
(45) Date of Patent: Mar. 26, 2019

(54) SYSTEM AND METHOD FOR APPLYING AN ANTENNA TUNING CORRECTION WITHIN AN ELECTRONIC DEVICE BASED ON LEFT/RIGHT HAND DETECTION

(71) Applicant: Google LLC, Mountain View, CA (US)

(72) Inventors: Vijay Asrani, San Jose, CA (US); Roshni Murari Srinivasan, Palo Alto, CA (US)

(73) Assignee: Google LLC, Mountain View, CA (US)

( * ) Notice: Subject to any disclaimer, the term of this patent is extended or adjusted under 35 U.S.C. 154(b) by 0 days.

(21) Appl. No.: 16/059,341

(22) Filed: Aug. 9, 2018

(65) Prior Publication Data

US 2018/0351239 A1 Dec. 6, 2018

Related U.S. Application Data

(63) Continuation of application No. 15/373,577, filed on Dec. 9, 2016, now Pat. No. 10,069,195.

(60) Provisional application No. 62/265,642, filed on Dec. 10, 2015.

(51) Int. Cl.
*H01Q 1/24* (2006.01)
*H01Q 9/04* (2006.01)

(52) U.S. Cl.
CPC ........... *H01Q 1/243* (2013.01); *H01Q 9/0442* (2013.01)

(58) Field of Classification Search
CPC ............................ H01Q 1/243; H01Q 9/0442
USPC ....................................................... 343/702
See application file for complete search history.

(56) References Cited

U.S. PATENT DOCUMENTS

2010/0109955 A1\* 5/2010 Anguera ................ H01Q 1/243
343/702

\* cited by examiner

*Primary Examiner* — Andrea Lindgren Baltzell
(74) *Attorney, Agent, or Firm* — Dority & Manning, P.A.

(57) ABSTRACT

In one aspect of the present subject matter, systems and methods are disclosed that allow for the detection of which of a user's hands is currently holding an electronic device. Based on such detection, an appropriate tuning correction may be applied to a first antenna and/or a second antenna of the electronic device to correct for any detuning caused by the user's hand.

20 Claims, 4 Drawing Sheets

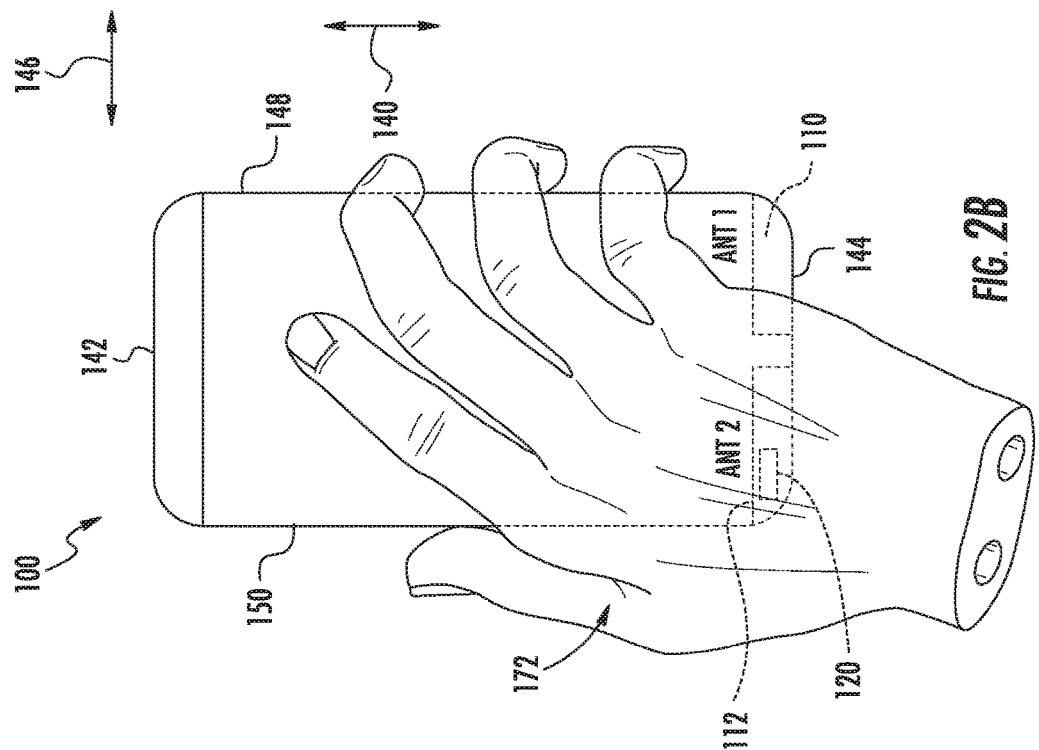
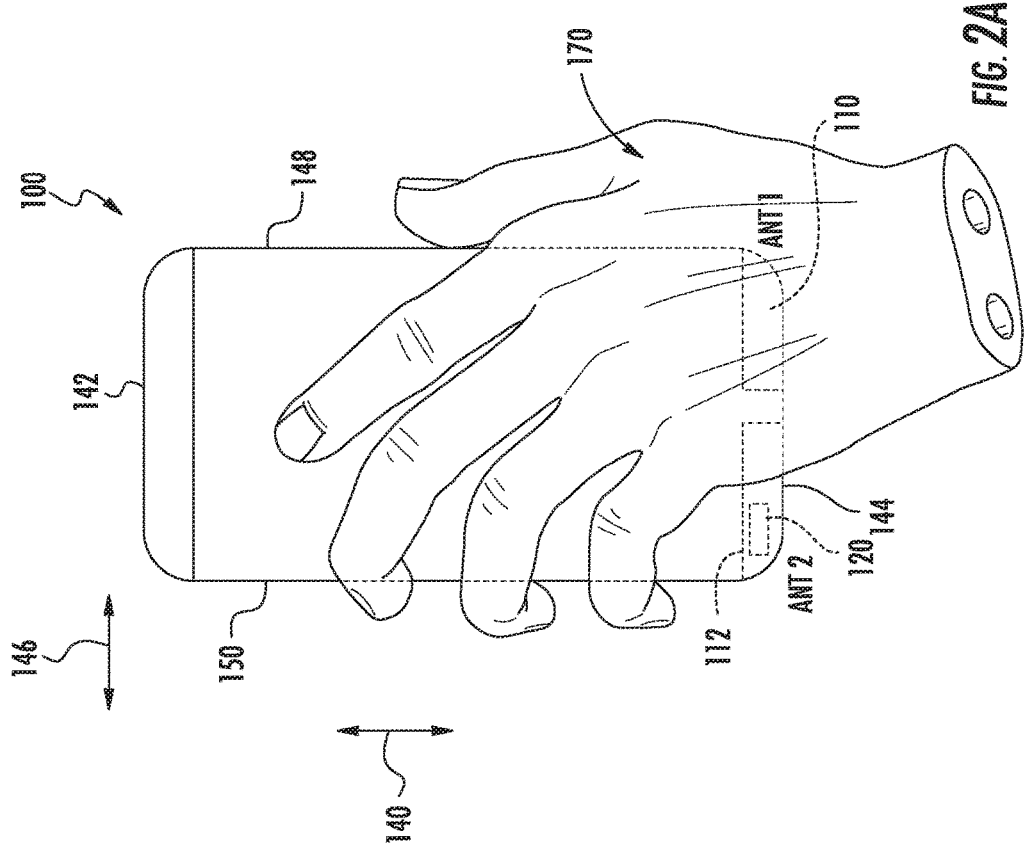

SYSTEM AND METHOD FOR APPLYING AN ANTENNA TUNING CORRECTION WITHIN AN ELECTRONIC DEVICE BASED ON LEFT/RIGHT HAND DETECTION

CROSS-REFERENCE TO RELATED APPLICATIONS

The present application is a continuation of U.S. application Ser. No. 15/373,577, filed on Dec. 9, 2016, which, in turn, claims priority to and the benefit of U.S. Provisional Application No. 62/265,642, filed on Dec. 10, 2015, the disclosures of both of which are hereby incorporated by reference herein in their entirety for all purposes.

FIELD

The present subject matter relates generally to electronic devices and, more particularly, to a system and method for applying an antenna tuning correction within an electronic device based on the detection of which of the user's hands is currently being used to hold the device.

BACKGROUND

Smartphones and other portable electronic devices typically include multiple antennas for transmitting and receiving data. For instance, smartphones often include a primary antenna that serves as the primary means for transmitting and receiving cellular data and a secondary antenna that allows for the transmission and/or receipt of cellular data in a diversity or a MIMO system and may also serve as the antenna for the receipt and/or transmission of other data, such as GPS data and/or data transmitted via Bluetooth. Based on design and space considerations, the primary and second antennas are often positioned at differing locations within the device housing, such as by being located at or along opposed sides of the device. As a result, the performance of each antenna may be impacted differently based on whether a user grasps the device with his/her left hand or right hand.

SUMMARY

Aspects and advantages of embodiments of the invention will be set forth in part in the following description, or may be obvious from the description, or may be learned through practice of the embodiments.

In general, exemplary aspects of the present subject matter may be directed to systems, methods, electronic devices, modules, apparatus, non-transitory computer-readable media, user interfaces and/or the like for applying antenna tuning corrections within a device based on the detection of whether such device is being currently held by a user's left hand or the user's right hand.

These and other features, aspects and advantages of the various embodiments will become better understood with reference to the following description and appended claims. The accompanying drawings, which are incorporated in and constitute a part of this specification, illustrate embodiments of the invention and, together with the description, serve to explain the related principles.

BRIEF DESCRIPTION OF THE DRAWINGS

Detailed discussion of embodiments directed to one of ordinary skill in the art, are set forth in the specification, which makes reference to the appended figures, in which:

FIG. 2A illustrates a rear view of the electronic device shown in FIG. 1 while the device is being grasped by a user's left hand in accordance with aspects of the present subject matter, particularly illustrating a first antenna of the device being occluded by the user's hand;

FIG. 2B illustrates another rear view of the electronic device shown in FIG. 1 while the device being grasped by a user's right hand in accordance with aspects of the present subject matter, particularly illustrating a second antenna of the device being occluded by the user's hand;

DETAILED DESCRIPTION

Figure 1:
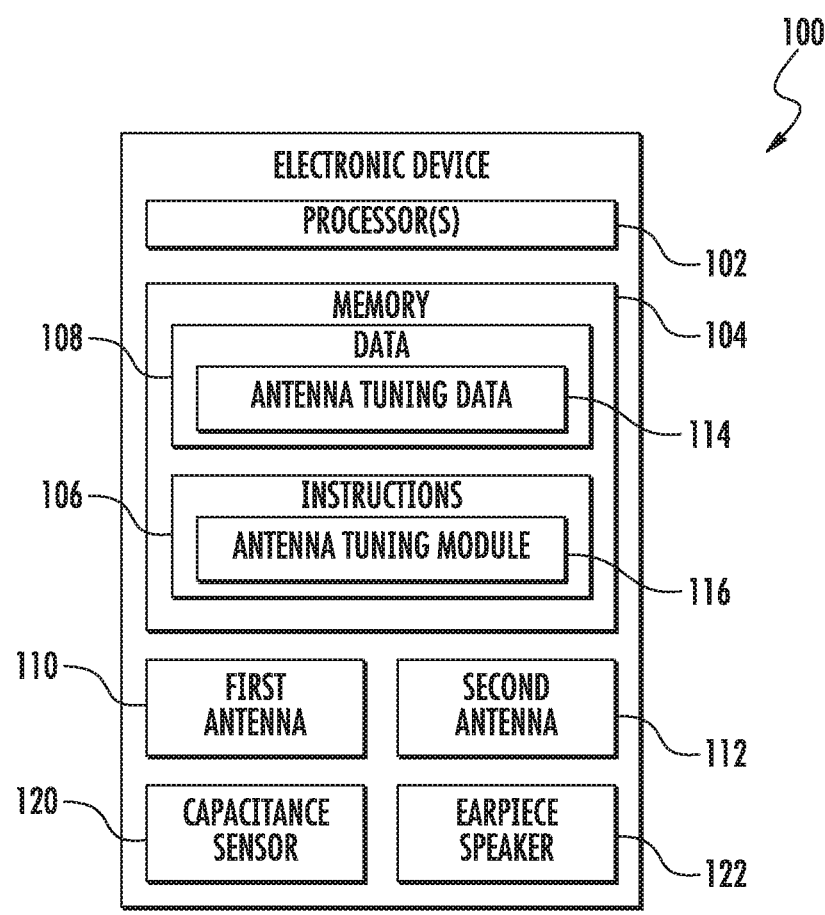
FIG. 1 illustrates a schematic view of one embodiment of an electronic device in accordance with aspects of the present subject matter.

Reference now will be made in detail to embodiments, one or more examples of which are illustrated in the drawings. Each example is provided by way of explanation of the embodiments, not limitation. In fact, it will be apparent to those skilled in the art that various modifications and variations can be made to the embodiments without departing from the scope or spirit of the embodiments. For instance, features illustrated or described as part of one embodiment can be used with another embodiment to yield a still further embodiment. Thus, it is intended that the present subject matter cover such modifications and variations as come within the scope of the appended claims and their equivalents.

In general, the present subject matter is directed to a system and method for applying an antenna tuning correction within an electronic device based on left/right hand detection. Specifically, in several embodiments, the system may be configured to determine the appropriate tuning correction to be applied to a first antenna and/or a second antenna of the electronic device based on the detection of which of the user's hands is currently holding the device. Such detection of the user's left/right hand may be useful for electronic devices having antennas whose performance (e.g., radiation efficiency) is impacted differently based on the location of the user's hand relative to the device, such as devices including asymmetric antenna designs. For instance, for an electronic device including a first antenna positioned on a first side of the device and a second antenna positioned on an opposed, second side of the device, the performance of the first antenna may be impacted more significantly when the user is grasping the device along its first side (e.g., using his/her left hand) while the performance of the second antenna may be impacted more significantly when the user is grasping the device along its second side (e.g. using his/her right hand). Accordingly, by detecting whether the device is currently being held by the user's left or right hand, a suitable tuning correction may be applied for the first antenna and/or the second antenna to account for any degradation in performance.

Referring now to FIG. 1, a schematic view of one embodiment of an electronic device 100 is illustrated in accordance with aspects of the present subject matter. In general, the electronic device 100 may correspond to any suitable computing device and/or other processor-based device known in the art. However, in several embodiments, the electronic device 100 may correspond to a portable electronic device, such as a smartphone, a tablet and/or any other suitable mobile device.

As shown in FIG. 1, the electronic device 100 may include a processor(s) 102 and a memory 104. The processor(s) 102 may be any suitable processing device, such as a microprocessor, microcontroller, integrated circuit, or other suitable processing device. Similarly, the memory 104 may include any suitable computer-readable medium or media, including, but not limited to, non-transitory computer-readable media, RAM, ROM, hard drives, flash drives, or other memory devices. The memory 104 may store information accessible by the processor(s) 102, including instructions 106 that can be executed by processor(s) 102 and data 108 that can be retrieved, manipulated, created, or stored by the processor(s) 102. In several embodiments, the data 108 may be stored in one or more databases.

Additionally, as shown in FIG. 1, the electronic device 100 may also include first and second antennas 110, 112 for wirelessly receiving and/or transmitting data to/from the device 100. In several embodiments, the first antenna 110 may correspond to a primary cellular antenna for the electronic device 100 and the second antenna 112 may correspond to a secondary cellular antenna for the device 100. In such an embodiment, the first antenna 110 may be configured to serve as the primary means for transmitting and receiving cellular data while the second antenna 112 may serve as a secondary means for transmitting and/or receiving cellular data. In such an embodiment, the second antenna 112 may also be configured to transmit and/or receive other types of data. For instance, the second antenna 112 may serve as a means for transmitting and/receiving data in a diversity receiver system or a MIMO antenna pair.

It should be appreciated that, although the first and second antennas 110, 112 are described herein as corresponding to the primary and secondary cellular antennas for the electronic device 100, respectively, each antenna 110, 112 may generally correspond to any suitable antenna configured for use with the device 100. For instance, in alternative embodiment, the second antenna 112 may correspond to the primary cellular antenna for the electronic device 100 while the first antenna 110 may correspond to the GPS or Bluetooth antenna for the device 100.

In several embodiments, the first and second antennas 110, 112 may be configured to be positioned at or adjacent to opposed sides of the electronic device 100. For instance, FIGS. 2A and 2B illustrate rear views of the electronic device 100 shown in FIG. 1. As shown, the electronic device 100 may generally extend lengthwise (indicated by arrow 140) between a top end 142 and a bottom end 144 and may generally extend widthwise (indicated by arrow 146) between a first side 148 (e.g., the right side of the device 100 when viewing the device 100 from the rear, as shown in FIGS. 2A and 2B) and a second side 150 (e.g., the left side of the device 100 when viewing the device 100 from the rear, as shown in FIGS. 2A and 2B), with the first and second sides 148, 150 extending lengthwise between the top and bottom ends 142, 144. In several embodiments, the first antenna 110 (also indicated in FIGS. 2A and 2B as ANT1) may be positioned on the first side 148 of the device 100 while the second antenna 112 (also indicated in FIGS. 2A and 2B as ANT1 2) may be positioned on the opposed, second side 150 of the device 100.

As indicated above, such asymmetric positioning of the antennas 110, 112 may lead to differing operating efficiencies depending on whether the user holds the electronic device 100 with his/her left hand or right hand. For instance, FIG. 2A illustrates the electronic device 100 being held by a user's left hand 170 while FIG. 2B illustrates the device 100 being held by a user's right hand 172. As particularly shown in FIG. 2A, when the device 100 is being held by the user's left hand 170, the user's hand is primarily positioned along the first side 148 of the device 100, which may significantly occlude or block the first antenna 110. As a result, the impact on antenna performance by the user's left hand 170 may be more significant for the first antenna 110 than the second antenna 112. Similarly, as shown in FIG. 2B, when the device 100 is being held by the user's right hand 172, the user's hand is primarily positioned along the second side 150 of the device 100, which may significantly occlude or block the second antenna 112. As a result, the impact on antenna performance by the user's right hand 172 may be more significant for the second antenna 112 than the first antenna 110.

In illustrated embodiment, the first and second antennas 110, 112 are both located adjacent to the bottom end 144 of the electronic device 100. However, in other embodiments, the antennas 110, 112 may be positioned at any other suitable location within the device 100 that provides for an asymmetric antenna configuration in which the radiation efficiency or other performance indicator of the antennas 110, 112 differs depending on whether the user is holding the device 100 with his/her left hand 170 or right hand 172.

Referring back to FIG. 1, in several embodiments, the memory 104 may include an antenna tuning database 114 for storing tuning parameter data for correcting any detuning or performance issues associated with the first and second antennas 110, 112. Specifically, in accordance with aspects of the present subject matter, the antenna tuning database 114 may include specific tuning correction parameters for each antenna 110, 112. For example, the database 114 may include one or more tuning correction parameters that are intended be used for the first antenna 110 depending on whether the user is holding the device 100 with his/her left or right hand. Similarly, the database 114 may include one or more tuning correction parameters that are intended be used for the second antenna 112 depending on whether the user is holding the device 100 with his/her left or right hand.

Moreover, the antenna tuning database 114 may also be configured to store any other suitable tuning-related data. For instance, in one embodiment, the database 114 may store pre-calibrated capacitance data corresponding to one or more capacitance threshold values defined for the electronic device 100. As will be described below, such threshold values may, for example, be used to determine whether the user is currently holding the device 100 with his/her left or right hand.

In several embodiments, the instructions 106 stored within the memory 104 may be executed by the processor(s) 102 to implement an antenna tuning module 116. In general, the antenna tuning module 116 may be configured to apply an appropriate tuning correction for the first antenna 110 and/or the second antenna 112 based on the determination of whether the electronic device 100 is currently being held by the user's left or right hand. For example, as will be described below, the antenna tuning module 116 may be configured to implement a tuning algorithm that allows for it to be inferred or determined whether the user is holding the device with his/her left or right hand. Based on such inference or determination, the tuning module 116 may be configured to apply a tuning correction for the first antenna 110 and/or second antenna 112 to account for any detuning occurring as a result of the user's hand.

It should be appreciated that, as used herein, the term "module" refers to computer logic utilized to provide desired functionality. Thus, a module may be implemented in hardware, application specific circuits, firmware and/or software controlling a general purpose processor. In one embodiment, the modules are program code files stored on the storage device, loaded into memory and executed by a processor or can be provided from computer program products, for example computer executable instructions, that are stored in a tangible computer-readable storage medium such as RAM, ROM, hard disk or optical or magnetic media.

Additionally, the electronic device 100 may also include a capacitance sensor 120. In several embodiments, the capacitance sensor 120 may be provided in operative association with the first antenna 110 or the second antenna 112. For instance, as will be described below, the capacitance sensor 110 may, in one embodiment, be connected to the second antenna 112, such as by coupling a DC-blocking capacitor in series with the antenna feed for the second antenna 112. Alternatively, the capacitance sensor 120 may be provided in operative association with the first antenna 110.

In general, the feedback from the capacitance sensor 120 may be used to infer whether the user is holding the device 100 with his/her left or right hand. For example, as shown in FIGS. 2A and 2B, the capacitance sensor 120 is provided in operative association with the second antenna 112 located on the second side 150 of the device 100. As such, when the user is holding the device 100 in the manner shown in FIG. 2B, the capacitance sensor 120 may detect a change in the capacitance associated with the second antenna 112, thereby providing an indication that the device 100 is being held in the user's right hand 172. Similarly, when the user is holding the device 100 in the manner shown in FIG. 2A, the capacitance sensor 120 may not detect a change in the capacitance associated with the second antenna 112 (or may only detect a minor change), thereby indicating that the device 100 is being held in the user's left hand 170.

Referring back to FIG. 1, the electronic device 100 may also include an earpiece speaker 122 configured to generate audible sounds. In several embodiments, the earpiece speaker 122 may be configured to be activated when it is assumed or detected that the device 100 is being held adjacent to the user's ear. For instance, when the device 100 is being used to make/receive a phone call, the earpiece speaker 122 may be activated to allow audible sounds to be generated at an appropriate volume given the assumed proximity of the device 100 to the user's ear.

Figure 3B:
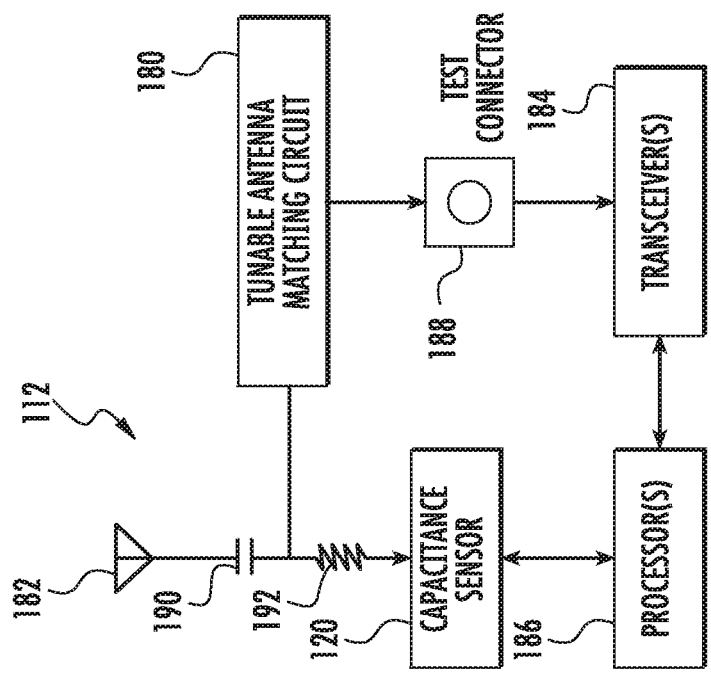
FIG. 3B illustrates a simplified block diagram of one embodiment of a tunable antenna matching circuit that may be used with the second antenna of the disclosed electronic device in accordance with aspects of the present subject matter.
Figure 3A:
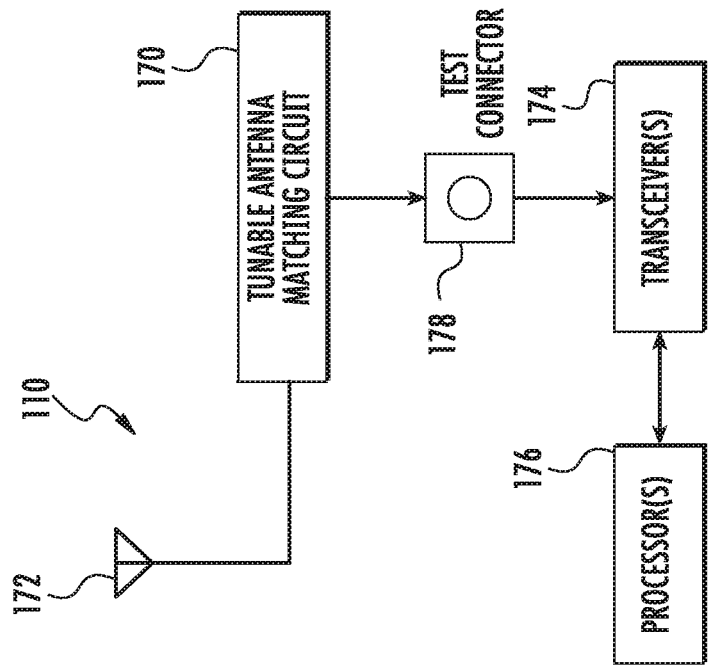
FIG. 3A illustrates a simplified block diagram of one embodiment of a tunable antenna matching circuit that may be used with the first antenna of the disclosed electronic device in accordance with aspects of the present subject matter.

Referring now to FIGS. 3A and 3B, simplified block diagrams of embodiments of tunable antenna matching circuits for the first and second antennas 110, 112 of the electronic device 100 described above are illustrated in accordance with aspects of the present subject matter. Specifically, FIG. 3A illustrates a simplified block diagram of one embodiment of a tunable antenna matching circuit that may be used with the first antenna 110 and FIG. 3B illustrates a simplified block diagram of one embodiment of a tunable antenna matching circuit that may be used with the second antenna 112.

As shown in FIG. 3A, a first tunable antenna matching circuit 170 may be coupled between an antenna feed 172 for the first antenna 110 and a transceiver(s) 174 associated with the first antenna 110. The first tunable antenna matching circuit 170 may generally be configured to apply a tuning correction parameter(s) so as to match the impedance of the transceiver(s) 174 to the impedance of the first antenna 110 and its associated feedline 172. The transceiver(s) 174 may, in turn, be coupled to one or more processors 176, such as the processor(s) 102 described above with reference to FIG. 1. In one embodiment, the processor(s) 176 may be configured to adjust the tuning parameter(s) applied by the first tunable antenna matching circuit 170 based on a determination as to the whether the electronic device 100 is being held in the user's left hand or right hand. Additionally, as shown in FIG. 3A, a test connector 178 may also be provided between the first tunable antenna matching circuit 170 and the associated transceiver(s) 174.

Moreover, as shown in FIG. 3B, a second tunable antenna matching circuit 180 may be coupled between an antenna feed 182 for the second antenna 112 and a transceiver(s) 184 associated with the second antenna 112. The second tunable antenna matching circuit 180 may generally be configured to apply a tuning correction parameter(s) so as to match the impedance of the transceiver(s) 184 to the impedance of the second antenna 112 and its associated feedline 182. The transceiver(s) 184 may, in turn, be coupled to one or more processors 186, such as the processor(s) 102 described above with reference to FIG. 1. In one embodiment, the processor(s) 186 may be configured to adjust the tuning parameter(s) applied by the second tunable antenna matching circuit 180 based on a determination as to the whether the electronic device 100 is being held in the user's left hand or right hand. Additionally, as shown in FIG. 3B, a test connector 188 may also be provided between the second tunable antenna matching circuit 180 and the associated transceiver(s) 184.

Further, as shown in FIG. 3B, a capacitance sensor 120 may be provided in operative association with the second antenna 112. Specifically, as shown in the illustrated embodiment, a capacitor 190 (e.g., a DC-blocking capacitor) may be coupled in series with the antenna feed 182 for the second antenna 112 in combination with a suitable resistor 192. As such, the capacitance sensor 120 may be configured to detect changes in the capacitance within the circuit, which may be indicative of which of the user's hands is being used to hold the device 100. For example, referring to the embodiment described above with reference to FIGS. 2A and 2B, a significant change in the capacitance within the circuit associated with the second antenna 112 may be indicative of the device 100 being held by the user's right hand.

In several embodiments, tuning may achieved with the tunable antenna matching circuits 170, 180 using switches (e.g., electronic, mechanical or electro-mechanical), one or more variable capacitors using BST or MEMS technology and/or any other suitable means. For example, the tuning parameter(s) for each antenna 110, 112 may be stored as digital tuning values in memory (e.g., with each digital tuning value being associated with a particular frequency band and a particular user's hand condition, such as whether the user is holding the device 100 with his/her left vs. right hand) and may be read by the processor(s) 176, 186 when the capacitance sensor 120 is triggered. The processor(s) 176, 186 may then provide the digital tuning values(s) to a digital-to-analog (DAC) converter, which may, in turn, provide suitable signal(s) to the tunable antenna matching circuit(s) 170, 180 for adjusting the antenna impedance for the desired frequency band. For example, the DAC converter may provide a voltage signal(s) for a variable capacitor(s) of the tunable antenna matching circuit(s) 170, 180 and/or provide a signal(s) for activating/deactivating a switch(es) of the tunable antenna matching circuit(s) 170, 180 to favorably adjust the antenna impedance.

Figure 4:
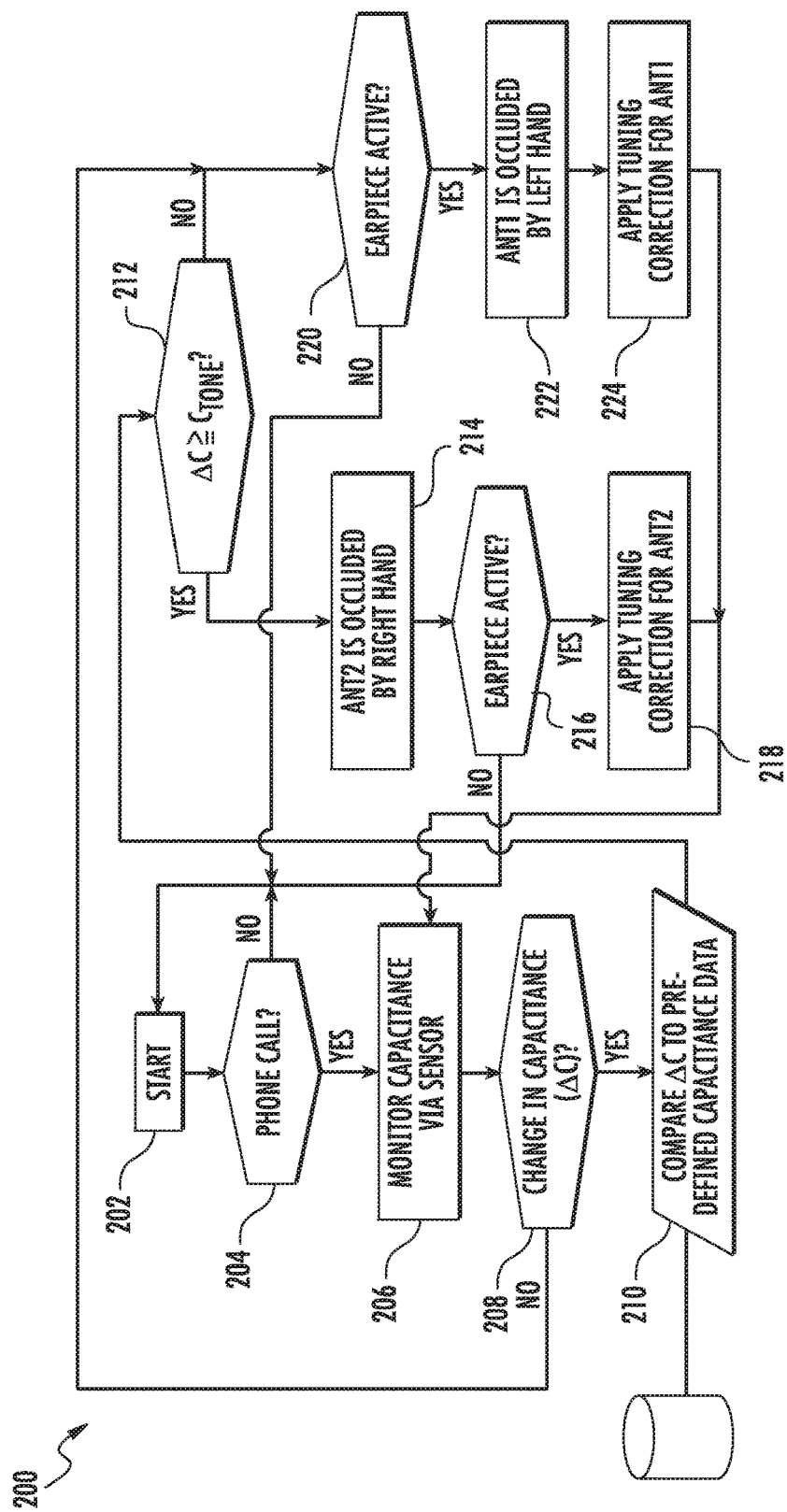
FIG. 4 illustrates a flow diagram of one embodiment of a tuning algorithm that may be used to apply an antenna tuning correction within an electronic device based on left/right hand detection in accordance with aspects of the present subject matter.

Referring now to FIG. 4, a flow diagram of one embodiment of a tuning algorithm 200 that may be implemented in order to apply a tuning correction for a first antenna and/or a second antenna of an electronic device is illustrated in accordance with aspects of the present subject matter. In general, the tuning algorithm 200 will be discussed herein with reference to the electronic device 100 and the antennas 110, 112 described above with reference to FIGS. 1-3B. However, those of ordinary skill in the art, using the disclosures provided herein, should appreciate that the algorithms described herein may be executed by any other electronic device having any other suitable device and/or antenna configuration. Additionally, it should be appreciated that, although the algorithm blocks are shown in FIG. 4 in a specific order, the various blocks of the disclosed algorithm 200 may generally be performed in any suitable order that is consistent with the disclosure provided herein.

As shown in FIG. 4, at (202), the tuning algorithm 200 may be initiated. Thereafter, at (204), it may be determined whether the electronic device 100 is currently being used to make/receive a phone call. If not, the tuning algorithm 200 may be returned to box 202. However, if the electronic device 100 is currently being used to make/receive a phone call, then, at (206), the capacitance sensor 120 may be used to monitor the capacitance associated with the second antenna 112. As shown in FIG. 4, if a change in capacitance (ΔC) is detected by the capacitance sensor 120 at box 208, then, at (210), such change in capacitance (ΔC) may be compared to pre-defined capacitance data associated with the electronic device 100. For instance, based on the configuration of the electronic device 100 (particularly the configuration and/or positioning of the antennas 110, 112), one or more capacitance values may be determined that are indicative of the change in capacitance occurring due to the device 110 being held in the user's right hand as opposed to the user's left hand. This capacitance value(s) may then be used as a threshold(s) for evaluating the change in capacitance (ΔC) detected by the capacitance sensor 120. For example, as shown in FIG. 4, at (212), the detected change in capacitance (ΔC) may be compared to a pre-defined capacitance threshold ($C_{TUNE}$). If the change in capacitance (ΔC) is greater than or equal to the pre-defined capacitance threshold ($C_{TUNE}$), at (214), it may be inferred that the device 100 is being held in the user's right hand, which may result in the second antenna 112 being at least partially occluded. Thereafter, at (216), it may be determined whether the earpiece speaker 122 for the electronic device 100 is currently activated. If not, the tuning algorithm 200 may be returned to box 202. However, if the earpiece speaker 122 is currently activated, it may be inferred that the electronic device 100 is being held adjacent to the user's ear, thereby providing a further indication that a tuning correction should be applied for the second antenna 112. As such, at (218), an appropriate tuning correction may be applied for the second antenna 112 to account for any detuning occurring due to the device 100 being held in the user's right hand. For instance, a pre-defined tuning correction may be stored within the device's memory 104 that can be applied to correct for the detuning caused by the user's right hand.

It should be appreciated that, in one embodiment, a plurality of different capacitance thresholds ($C_{TUNE}$) may be defined for the electronic device 100 based on the device configuration and/or the manner in which the device 100 is being used or held. For instance, differing capacitance thresholds ($C_{TUNE}$) may be defined based on a categorization of the firmness of the user's grip on the device 100, such as by defining different capacitance thresholds ($C_{TUNE}$) for a loose grip, an average grip and a firm grip.

Referring still to FIG. 4, if a change in capacitance (ΔC) is not detected by the capacitance sensor 120 at box 208 or if the detected change in capacitance (ΔC) is less than the pre-defined capacitance threshold ($C_{TUNE}$) at box 212, it may be determined, at (220), whether the earpiece speaker 122 for the electronic device 100 is currently activated. If not, the tuning algorithm 200 may be returned to box 202. However, if the earpiece speaker 122 is currently activated, it may be inferred that the electronic device 100 is being held adjacent to the user's ear. Additionally, given the lack of a significant change in capacitance (ΔC) as indicated by the capacitance sensor 120, it may be further inferred, at (222), that the device 100 is being held in the user's left hand, which may result in the first antenna 110 being at least partially occluded. As a result, at (224), an appropriate tuning correction may be applied for the first antenna 110 to account for any detuning occurring due to the device 100 being held in the user's left hand. For instance, a pre-defined tuning correction may be stored within the device's memory 104 that can be applied to correct for the detuning caused by the user's right hand.

It should be appreciated that, although the algorithm 200 shown in FIG. 4 has been generally described as an antenna tuning algorithm, the algorithm 200 may also be used to implement power cutbacks for meeting applicable FCC regulations regarding Specific Absorption Rate (SAR) limits. For example, by detecting the change in capacitance (or lack thereof) using the capacitance sensor 120 and by determining whether the earpiece speaker 122 is active, it may be inferred when the electronic device 100 is being held adjacent to the user's body. In such instance, a power correction may be implemented, as necessary, to reduce the power output of the electronic device 100.

While the present subject matter has been described in detail with respect to specific exemplary embodiments and methods thereof, it will be appreciated that those skilled in the art, upon attaining an understanding of the foregoing may readily produce alterations to, variations of, and equivalents to such embodiments. Accordingly, the scope of the present disclosure is by way of example rather than by way of limitation, and the subject disclosure does not preclude inclusion of such modifications, variations and/or additions to the present subject matter as would be readily apparent to one of ordinary skill in the art.

What is claimed is:

1. A method for applying an antenna tuning correction within an electronic device, the electronic device including a first antenna and a second antenna spaced apart from the first antenna within the electronic device, the method comprising:

monitoring, with a processor, a parameter associated with an operating performance of at least one of the first antenna or the second antenna, the monitored parameter providing an indication of a position of a user's hand relative to the electronic device;

determining, with the processor, whether one of the first antenna or the second antenna is at least partially occluded based on the monitored parameter; and applying, with the processor, a tuning correction to the one of the first antenna or the second antenna to account for any detuning occurring due to the one of the first antenna or the second antenna being at least partially occluded.

2. The method of claim 1, wherein monitoring the parameter associated with the operating performance of the at least one of the first antenna or the second antenna comprises monitoring the parameter while the electronic device is being used to make or receive a phone call.

3. The method of claim 2, further comprising applying the tuning correction to the one of the first antenna or the second antenna after it is determined that an earpiece speaker for the electronic device is currently activated.

4. The method of claim 1, wherein the monitored parameter provides an indication of whether the user's hand is positioned closer to the first antenna than the second antenna.

5. The method of claim 4, wherein applying the tuning correction to the one of the first antenna or the second antenna comprises applying the tuning correction to the first antenna when a change in the monitored parameter is detected that exceeds a predetermined threshold.

6. The method of claim 4, wherein applying the tuning correction to the one of the first antenna or the second antenna comprises applying the tuning correction to the second antenna when a change in the monitored parameter is detected that is less than a predetermined threshold or if no change in the monitored parameter is detected.

7. The method of claim 1, wherein the first and second antennas are positioned within the electronic device such that the first antenna is at least partially occluded when one of a user's left hand or right hand is being used to hold the electronic device and the second antenna is at least partially occluded when the other of the user's left hand or right hand is being used to hold the electronic device.

8. The method of claim 1, wherein the first antenna is positioned adjacent to a first side of the electronic device and the second antenna is positioned adjacent to a second, opposite side of the electronic device.

9. A system for applying an antenna tuning correction within an electronic device, the system comprising:
   a first antenna including a first tunable antenna matching circuit and a first transceiver;
   a second antenna including a second tunable antenna matching circuit and a second transceiver; and
   at least one processor and associated memory, the memory storing instructions that, when implemented by at least one processor, configure the at least one processor to:
      monitor a parameter associated with an operating performance of at least one of the first antenna or the second antenna, the monitored parameter providing an indication of a position of a user's hand relative to the electronic device;
      determine whether one of the first antenna or the second antenna is at least partially occluded based on the monitored parameter; and
      transmit a tuning signal to the one of the first antenna or the second antenna to account for any detuning occurring due to the one of the first antenna or the second antenna being at least partially occluded.

10. The system of claim 9, wherein, when it is determined that the first antenna is at least partially occluded, the at least one processor transmits a tuning signal associated with a tuning parameter for the first antenna to the first tunable antenna matching circuit such that the first tunable antenna matching circuit applies a tuning correction to the first transceiver to account for any detuning occurring due to the first antenna being at least partially occluded.

11. The system of claim 9, wherein, when it is determined that the second antenna is at least partially occluded, the at least one processor transmits a tuning signal associated with a tuning parameter for the second antenna to the second tunable antenna matching circuit such that the second tunable antenna matching circuit applies a tuning correction to the second transceiver to account for any detuning occurring due to the second antenna being at least partially occluded.

12. The system of claim 9, wherein the parameter is monitored while the electronic device is being used to make or receive a phone call.

13. The system of claim 12, wherein the at least one processor is configured to transmit the tuning signal after it is determined that an earpiece speaker for the electronic device is currently activated.

14. The system of claim 9, wherein the monitored parameter provides an indication of whether the user's hand is positioned closer to the first antenna than the second antenna.

15. The system of claim 14, wherein the at least one processor transmits the tuning signal to the first antenna when a change in the monitored parameter is detected that exceeds a predetermined threshold.

16. The system of claim 14, wherein the at least one processor transmits the tuning signal to the second antenna when a change in the monitored parameter is detected that is less than a predetermined threshold or if no change in the monitored parameter is detected.

17. The system of claim 9, wherein the first and second antennas are positioned within the electronic device such that the first antenna is at least partially occluded when one of a user's left hand or right hand is being used to hold the electronic device and the second antenna is at least partially occluded when the other of the user's left hand or right hand is being used to hold the electronic device.

18. The system of claim 9, wherein the first antenna is positioned adjacent to a first side of the electronic device and the second antenna is positioned adjacent to a second, opposite side of the electronic device.

19. An electronic device, comprising:
   a housing extending lengthwise between a top end and a bottom end and widthwise between a first end and a second end;
   a first antenna positioned adjacent to the first side of the housing such that the first antenna is configured to be at least partially occluded when one of a user's left hand or right hand is being used to hold the housing;
   a second antenna positioned adjacent to the second side of the housing such that the second antenna is configured to be at least partially occluded when the other of the user's left hand or right hand is being used to hold the housing; and
   at least one processor and associated memory, the memory storing instructions that, when implemented by at least one processor, configure the at least one processor to:
      monitor a parameter associated with an operating performance of at least one of the first antenna or the second antenna that is indicative of whether the housing is being held by the user's left hand or right hand and
      transmit a tuning signal to one of the first antenna or the second antenna to account for any detuning occurring due to the one of the first antenna or the second antenna being at least partially occluded by the user's left hand or right hand.

20. The electronic device of claim 19, wherein the at least one processor is configured to transmit the turning signal to the one of the first antenna or the second antenna after it is determined that an earpiece speaker for the electronic device is currently activated.

\* \* \* \* \*